United States Patent
Roy Chowdhury et al.

(10) Patent No.: US 11,847,603 B1
(45) Date of Patent: Dec. 19, 2023

(54) NEIGHBORHOOD AWARE GEOFENCE GENERATION

(71) Applicant: Amazon Technologies, Inc., Seattle, WA (US)

(72) Inventors: Amber Roy Chowdhury, Bellevue, WA (US); Tarun Bhatia, Sunnyvale, CA (US); Ravi Garg, Bellevue, WA (US); Valerie Galluzzi Liptak, Seattle, WA (US); George Henry Forman, Port Orchard, WA (US)

(73) Assignee: Amazon Technologies, Inc., Seattle, WA (US)

( * ) Notice: Subject to any disclaimer, the term of this patent is extended or adjusted under 35 U.S.C. 154(b) by 323 days.

(21) Appl. No.: 17/379,004

(22) Filed: Jul. 19, 2021

(51) Int. Cl.
G06Q 10/083 (2023.01)
H04W 4/021 (2018.01)
G06F 16/29 (2019.01)

(52) U.S. Cl.
CPC ........... G06Q 10/083 (2013.01); G06F 16/29 (2019.01); H04W 4/022 (2013.01)

(58) Field of Classification Search
CPC ...... G06Q 10/083; G06F 16/29; H04W 4/022
See application file for complete search history.

(56) References Cited

U.S. PATENT DOCUMENTS

2018/0040011 A1* 2/2018 Milton ................. H04W 4/021
2019/0301892 A1* 10/2019 Santilli ............. G06Q 10/0833

* cited by examiner

Primary Examiner — Geepy Pe
Assistant Examiner — Kimia Kohankhaki
(74) Attorney, Agent, or Firm — Kilpatrick Townsend & Stockton LLP

(57) ABSTRACT

Techniques for a geofence generation feature are described herein. Geospatial vector data for a geographical area and seed points for delivery locations within the geographical area may be obtained. A plurality of polygons that represent the geographical area may be determined based on an algorithm that uses the seed points and the geospatial vector data. A boundary point for each polygon may be determined based on coordinates for the plurality of polygons where each boundary point corresponds to a single seed point. A geofence of a first size may be generated, for each polygon, based on the coordinates for the polygons, the seed point, and the boundary point. Historical scans of GPS data may be obtained from user devices during historical visits to the geographical area. The geofence may be modified to a second size or a different shape based on the historical scans of the GPS data.

20 Claims, 9 Drawing Sheets

NEIGHBORHOOD AWARE GEOFENCE GENERATION

BACKGROUND

Some merchants and e-commerce organizations offer delivery of their goods to a consumer's residence as a service. As cities and towns grow larger and population density increases, it becomes more difficult to deliver goods to an appropriate location accurately. Conventional systems for guiding delivery associates during a delivery for a given package may result in a misdelivery or a delivery to a neighboring location. For example, conventional systems may utilize static geofences which do not account for a number of technological or environmental attributes which can result in packages being misdelivered. Further, enforcement of geofences for an area can result in increased friction on delivery associates as they attempt to report their delivery in a particular location which results in longer delivery times and dissatisfied customers. Conventional geofence generation systems may result in incorrect geofences as many techniques fail to account for delivery road networks and barriers which can result in deliveries which are technically within a geofence but inappropriate for customers to retrieve their packages.

BRIEF DESCRIPTION OF THE DRAWINGS

Various embodiments in accordance with the present disclosure will be described with reference to the drawings, in which.

DETAILED DESCRIPTION

Figure 1:
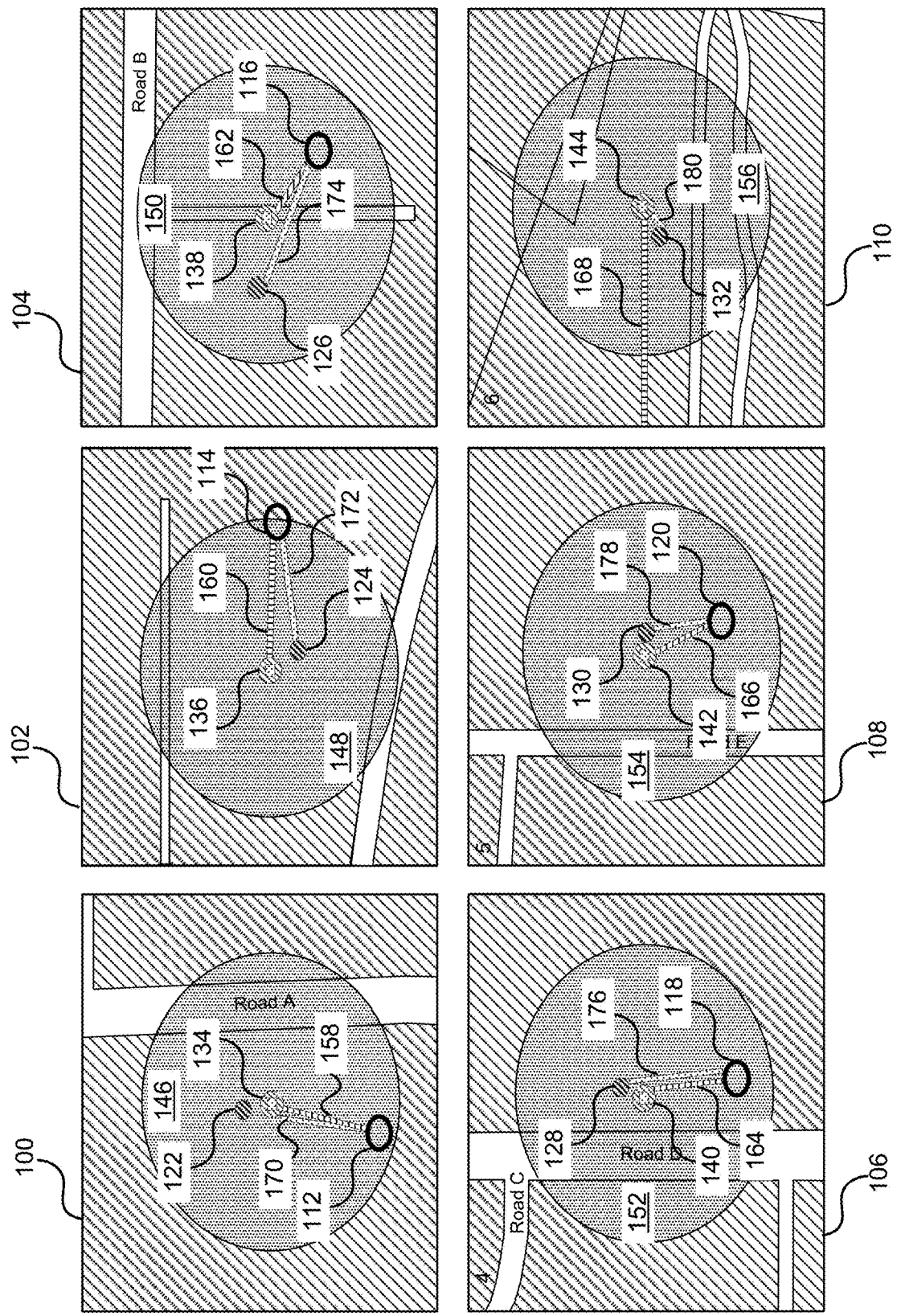
FIG. 1 illustrates positions of GPS scans from a delivery entity while delivering an item to a particular delivery location with reference to an expected delivery point and a nearest neighboring delivery point.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques for a geofence generation feature for generating and modifying geofences for a geographical area to aid delivery entities while delivering products to the geographical area or picking up products from the geographical area are described herein. In embodiments, the generated and modified geofences may be used to ensure compliance of a delivery entity with one or more policies while delivering or picking up a product (an item or service) to a particular delivery location within the geographical area. In embodiments, a delivery location may correspond to a single address or many addresses within a geographical area. In some embodiments a delivery location may or may not correspond to an address. For example, in situations where a structure includes a large plot of land and a gate that is locked the delivery location may correspond to the gate for the structure. When the gate is unlocked, the delivery location may correspond to the structure and therefore may correspond to an address. In scenarios where a delivery or pickup of a product corresponds to an apartment complex, condo complex, or multi-unit structure, a delivery location may be assigned to a corresponding central location, such as a mail room, or to a particular unit within the structure. In such cases the service provider computer implementing the geofence generation feature may generate a series of geofences which can be utilized by a delivery entity to resolve the delivery or pickup of the product. For example, the mail room may be closed in which case the system would generate and transmit the geofence for a particular unit of the multi-complex structure. The geofence generation feature may include generating a geofence for a delivery location in a one-to-one situation as well as a one-to-many situation. A delivery location may be used even though the operation being performed at the delivery location is a pickup or a delivery of a product. In accordance with at least one embodiment, the generated and modified geofences may be used to identify coordinates for an area (safe zone) for each delivery location that is provided as a visual indicator(s) on a user interface to help guide a delivery entity during delivery or pickup of a product to said delivery location. It should be noted that although the disclosure describes deliveries of items, the geofence generation feature includes delivering a product (an item or service) or picking up the product from a delivery location within the geographical area. In embodiments, a service provider computer (one or more service provider computers) implementing the geofence generation feature may obtain geospatial vector data and seed points for a geographical area to partition or divide the geographical area into a plurality of polygons. In accordance with at least one embodiment, the service provider computers may utilize a bounding box of latitude and longitude coordinates as the geographical area to determine geofences according to the geofence generation feature described herein. The geographical area may be defined or specified by a series of points and/or lines. The service provider computer may be configured to implement a Dirichlet Tessellation algorithm that uses the seed points and geospatial vector data to generate the plurality of polygons that represent the geographical area. The polygons may include Voronoi polygons which may be barrier aware polygons. The polygons may be complex polygons or multi-polygons. A portion of the geographical area may be uniquely assigned to each polygon of the polygons and include a singular seed point. An example of a seed point may include a geocode for an address (delivery location) within the geographical area or a delivery point that corresponds to the address within the geographical area. In embodiments, a geographical area may include an area that is defined using units of geography such as a standardized unit of geography represented in a ZIP code, a postal code, neighborhoods, census tracts, or ZIP code tabulation areas.

An example of barrier aware polygons includes a process for partitioning of a plane (geographical area) with n seed points into convex polygons such that each polygon contains exactly one seed point and every point in a given polygon is closer to its seed point than to any other seed point. In embodiments, the service provider computers may utilize coordinates which represent the boundaries for each polygon to determine a boundary point for each seed point and corresponding polygon. In accordance with at least one embodiment, a boundary point represents the nearest boundary point of the nearest polygon. The service provider computers may utilize the boundary point and seed point to determine a radius of a circle which will serve as the radius for determining a geofence of a first size for a given polygon of the polygons that represent the geographical area. A geofence may refer to a virtual perimeter for a real-world geographic area that includes a radius around a point location (e.g., delivery point or seed point), or a defined set of boundaries for shapes other than circles. The geofences of a first size generated by the service provider computers may be of a certain size and/or shape such that each geofence for each polygon does not overlap the geofence for another polygon within the geographical area.

In accordance with at least one embodiment, the geofence generation feature includes modifying the size and/or shape of a generated geofence based on other information to reduce stress of delivery entities while attempting to comply with geofence policies during delivery or to aid the delivery entities during delivery of items to delivery points. For example, the service provider computers implementing the geofence generation feature may utilize barrier geospatial vector data, historical scans of GPS data from user devices during historical visits to the geographical area (e.g., service calls, delivery of products, pickup of products, data from third parties, etc.,), GPS accuracy data (historical or real time data), neighborhood data, or one or more cost function policies which weigh cost parameters differently to determine whether to modify the size and/or shape of a previously generated geofence for each address of the addresses included in the geographical area. The service provider computers may utilize data from third party providers to increase the accuracy of deliveries to a geographical area by modifying a corresponding geofence for a delivery location. In embodiments, barrier geospatial vector data may represent and include shapes, coordinates, and locations of barriers such as road networks, road entrances, parks, rivers, lakes, or other barriers which may be used to modify the shape and size of the geofence for each polygon. By utilizing such information the modified geofences can be said to be neighborhood aware in a sense that the size and shape of the geofences respect boundaries and locations of structures, barriers, obstacles, or even neighboring locations. The modified geofences can be utilized as more accurate guardrails to ensure that delivery entities are conforming to delivery policies which require check-ins or GPS scan data from associated user devices during or after a delivery that must be within a certain distance of a given delivery point for an address.

In embodiments, the service provider computers implementing the geofence generation feature may be configured to generate data objects or user interface objects for updating a user interface of a user device associated with a delivery entity during delivery of an item to a delivery point for an address within a geographical area. For example, the service provider computer may generate a user interface object which can be incorporated into the user interface to provide visual indicators, boundaries, coordinates, or mark a safe zone on a map of the geographical area which would ensure that the delivery entity complies with GPS policies as well as deliver an item to the correct recipient. The service provider computers may be configured to request input from a delivery entity during a delivery of an item to confirm correct GPS location within a geofence for a delivery point and therefore ensure compliance with a GPS policy or obtain feedback regarding the delivery for enabling the delivery entity to continue to a subsequent delivery.

The service provider computer may implement one or more algorithms, such as machine learning algorithms, according to the one or more cost function policies to determine a cost for modifying a previously generated geofences size and/or shape given various constraints such as increasing the risk of a customer reporting an item not delivered, crossing barriers such as roads, rivers, or parks, or overlapping with a geofence of a neighboring location. The constraints or metrics identified in the one or more cost function policies may be weighed differently to determine whether to modify the size and/or shape of a previously generated geofence for each address. For example, given a situation of a high-rise apartment building with multiple units, each accessible by a delivery entity, if the constraint of having no overlap between geofences were to be maintained each resultant geofence would be very small. A delivery entity attempting to comply with GPS policies while delivering items to the apartment building would most likely fail to provide accurate GPS data given the GPS noise for a high-rise building and would also fail to likely provide GPS scan data or check-in data which would comply with being inside each geofence. In such situations the service provider computer may determine, using the one or more cost function policies, that allowing geofences for this location to overlap would be optimal as opposed to enforcing a non-overlapping constraint. In accordance with at least one embodiment, the geographical area, the geospatial vector data, and the barrier geospatial vector data may be represented and maintained as a Shapefile. The service provider computers implementing the geofence generation feature may access, modify, and maintain one or more Shapefiles during geofence generation for a geographical area. A Shapefile may include a nontopological format for storing geometric location and attribute information of geographic features and may be represented as points, lines or polygons. The geographical area, barriers for the geographical area, and the Voronoi polygons or polygons generated by the service provider computers may include geospatial vector data usable in a geospatial vector data format by a computer system.

The processes and systems described herein may be an improvement on conventional geofence generation techniques which are used to guide entities during deliveries. For example, conventional geofence generation techniques may generate a geofence of a static size for each or delivery point within a geographical area. This can result in several problems such as delivery entities being unable to comply with geofence GPS policies because of poor GPS hygiene (e.g., the delivery entity waits until several deliveries in the same area are completed before providing a GPS signal to indicate their location, or GPS accuracy not being taken into account (e.g., certain areas have poor GPS coverage and devices in such areas may be delayed or unable to provide GPS data. For organizations that enforce delivery policies this can result in inefficient delivery by the delivery entities as they are forced to go back to an area and resend GPS data, interact with a user interface to provide input indicating a location during a delivery, or in some situations communicate with a support line to resolve a compliance issue before they are allowed to move onto a next delivery. Some delivery entities may turn off their user devices during deliveries to avoid attempting to satisfy a difficult enforcement GPS policy. However, this can lead to additional problems which the geofences were intended to solve such as deliveries being made far from an expected delivery point. In such cases customers may report that an item was never delivered. Delivery entities may be presumed to have delivered an item to a neighbor or neighbor location depending on their GPS scan data with respect to a geofence for an intended delivery point. Conventional systems are unable to account for the intricacies of neighborhoods, high density areas, and reduce delivery entity stress when trying to comply with GPS policies.

The geofence generation feature implemented by the systems described herein results in a more optimized delivery cycle for delivery entities while increasing precision of deliveries to an intended delivery point. In embodiments, the geofence generation feature described herein generates and modifies the size and shape of geofences to an optimal size and shape given the context of the neighborhood (e.g., barriers, other neighboring locations, historical GPS scan data, GPS accuracy, structural data, lot or plot size data). The service provider computers implementing the geofence generation feature can also implement one or more cost function policies to determine a cost for modifying a previously generated geofences size and/or shape given various constraints such as increasing the risk of a customer reporting an item not delivered, crossing barriers such as roads, rivers, or parks, or overlapping with a geofence of a neighboring location. Geofences generated according to the techniques described herein can provide better guardrails to enforce GPS policies to increase precision when delivering an item to an intended delivery point and provide guidance to delivery entities during delivery. For example, the service provider computers may generate a user interface object to be incorporated into a user interface of a user device which can help guide a delivery entity during delivery of an item to an intended delivery point. The user interface object may include visual indicators which are overlaid or otherwise integrated into a map of a geographical area which can guide the delivery entity to an area that corresponds to increasing precision to the delivery point and being compliant with GPS policies.

FIG. 1 illustrates positions of GPS scans from a delivery entity while delivering an item to a particular address with reference to an expected delivery point and a nearest neighboring delivery point. FIG. 1 depicts a representation of different areas 100-110 for a geographical area. Each area 100-110 includes a depiction of GPS scans or profiles for said area that resulted in a did-not-receive response (the customer was expecting an item and it was never delivered) from a customer associated with a delivery point for the area. In areas 100-108, the bold lined circles (112-120) represent a delivery point for the area, circles with a first gradient (122-132) represent a nearest neighboring delivery point, and the circles with a square inside of them (134-144) represent GPS scan data from the delivery entity's user device while delivering an item to each area. The large circles 146-156 represent the GPS accuracy for each area 100-110. The lines with a first gradient (158-168) represent a distance between the GPS scan data (134-144) and the delivery point (112-120) for areas 100-110 (area 110 does not depict a delivery point in scale with the other data points for area 110). The lines with a second gradient (170-180) for areas 100-110 represent a distance between the GPS scan data (134-144) and the nearest neighboring delivery point (122-132).

The scenarios illustrated in FIG. 1 which resulted in a did-not-receive response from customers were harder to identify as out of compliance with GPS policies using conventionally generated geofences. For example, as illustrated in the areas 100-108, the distances (158-166) between an expected delivery point (112-120) and the nearest neighboring delivery point (122-130) are such that conventional geofences for the expected delivery points 112-120 would likely overlap with geofences for the nearest neighboring delivery points 122-130. Although the geofence generation feature described herein may modify the size and/or shape of a generated geofence to overlap with one or more other geofences for nearby locations or delivery points, the systems and methods described herein apply one or more cost function policies to determine optimal modifications to the geofence using various metrics and data points or information.

However, the conventional geofences implemented and utilized in the scenarios depicted in FIG. 1 enable situations where a delivery entity is still in compliance with a GPS policy (e.g., providing GPS scan data (134-144) within a geofence for a delivery point) yet the customer reports a did-not-receive response indicating that the item was not delivered to the expected delivery point (112-120). The depicts of delivery points (112-120), GPS scan data (134-144), and nearest neighboring delivery points (122-130) could indicate a scenario where the delivery entity accidentally delivered an item to a neighboring location. However, this is not guaranteed. A delivery entity may have delivered or intended to deliver an item to the delivery points (112-120) and to the nearest neighbor (nearest neighboring delivery points 122-130) and only provided the GPS scan data 134-144 after completing both deliveries resulting in the depictions for areas 100-110 illustrated in FIG. 1. Despite the exact scenario that occurred, conventional geofence generation techniques fail to provide proper guardrails for GPS policies and provide no guidance which would reduce the number of did-not-receive responses provided by customers similar to the customers associated with the scenarios illustrated in FIG. 1.

Figure 2:
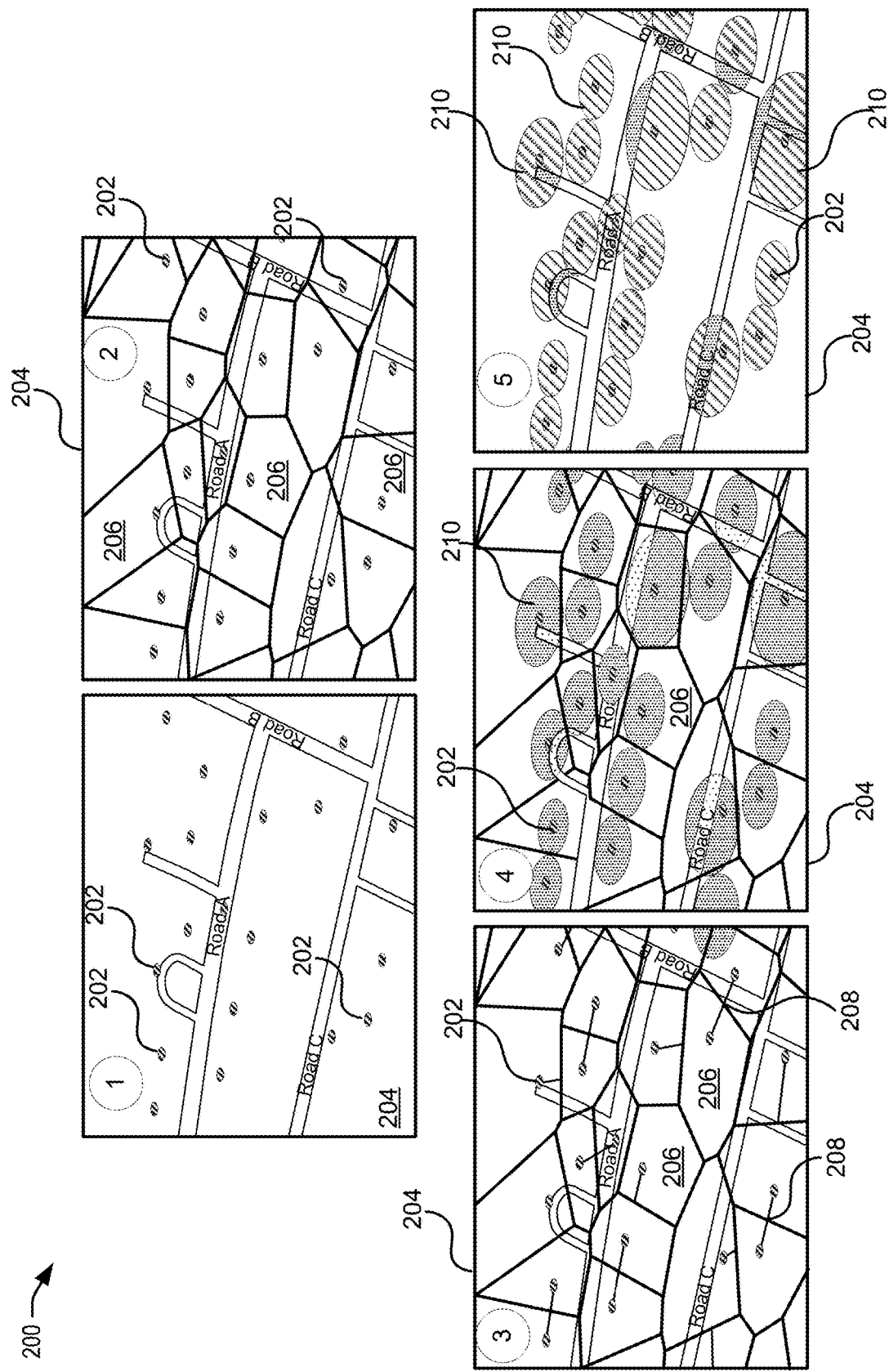
FIG. 2 illustrates an example of generating neighborhood aware geofences for a geographical area utilizing a geofence generation feature, in accordance with at least one embodiment.

FIG. 2 illustrates an example of generating neighborhood aware geofences for a geographical area utilizing a geofence generation feature, in accordance with at least one embodiment. FIG. 2 depicts process 200 for generating neighborhood aware geofences according to the geofence generation features described herein. In accordance with at least one embodiment, the service provider computers implementing the geofence generation features may obtain or otherwise receive seed points 202 for a geographical area 204. In embodiments, a seed point 202 may be unique or distinct for an address within the geographical area 204 or geocode within the geographical area 204. Each seed point 202 may correspond to a delivery point. In accordance with at least one embodiment, the service provider computers may obtain the seed points 202 from a third party computer and determine a best seed point for each address or geocode within the geographical area 204 by ranking the seed points using a ranking algorithm.

The process 200 of FIG. 2 includes, at step 1, obtaining the seed points 202 for the geographical area 204. The process 200, in embodiments, at step 2 includes utilizing a Dirichlet Tessellation algorithm or other suitable algorithm that uses the seed points 202 and geospatial vector data for the geographical area 204 to generate a plurality of polygons 206 that represent the geographical area. The polygons 206 may include Voronoi polygons which may be barrier aware polygons. In accordance with at least one embodiment, each seed point 202 may be assigned a polygon 206. The polygons 206 may be convex non-overlapping polygons as illustrated in FIG. 2. The process 200 of FIG. 2 includes, at step 3, determining a boundary point 208 for each seed point 202. In embodiments, a boundary point 208 represents the nearest boundary point of the nearest polygon 206 for each polygon 206 and seed point 202 pair. The service provider computers may utilize the boundary point 208 and seed point 202 to determine a radius of a circle which will serve as the radius for determining a geofence 210 of a first size for a given polygon 206 of the polygons 206 that represent the geographical area.

The process 200 of FIG. 2 includes at step 4 generating the geofences 210 of a first size using the seed point 202 and boundary point 208 for each polygon 206. The generated geofences 210 of a first size result in a plurality of non-overlapping geofences 210 for the geographical area 204 which respect the boundaries of polygons 206 and therefore the boundaries of each delivery point 202. The process 200 of FIG. 2 includes at step 5 by removing the polygons 206 and assigning the geofences 210 to the delivery points (seed points 202) for the geographical area 204. As described above, the geofences 210 may be non-overlapping as they are generated at a first size and shape. However, as described herein the service provider computers implementing the geofence generation features may modify the size and/or shape of the geofences 210 using more information and by applying one or more cost function policies. It should be noted that although the geofences 210 of FIG. 2 and the other FIGs. of the current disclosure are circular in shape the embodiments described herein are not limited to only circles. Other shapes of various sizes may also be generated according to the geofence features described herein. The geofences 210 illustrated in FIG. 2 for geographical area 204 provide for a starting point which can be further refined or modified to provide an optimal size and shape to serve as an effective guardrail for GPS policies which are enforced according to whether a delivery entity provides a GPS scan within a geofence for a delivery point as well as guidance to aid the delivery entity to identifying an appropriate area to deliver an item for the delivery point.

Figure 3:
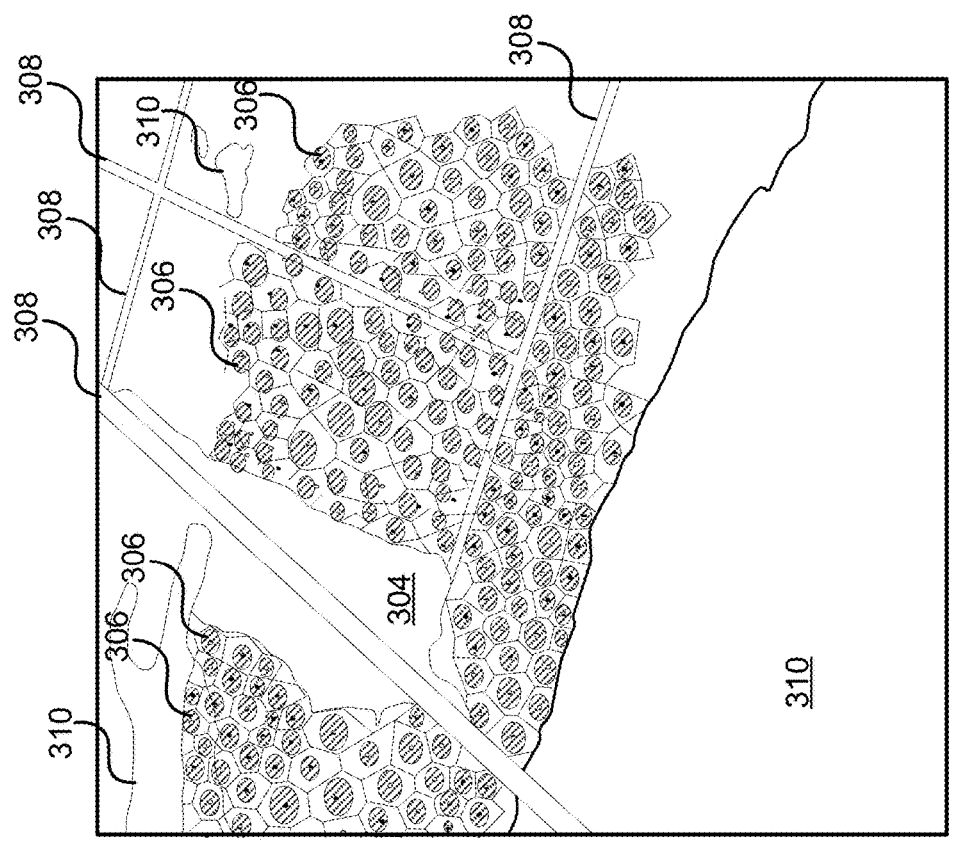
FIG. 3 illustrates an example of generating geofences which respect boundaries for certain barriers such as road networks using seed points for a geographical area and barrier geospatial vector data for the geographical area corresponding to the geofence generation feature, in accordance with at least one embodiment.
Figure 3:

FIG. 3 illustrates an example of generating geofences which respect boundaries for certain barriers such as road networks using seed points for a geographical area and barrier geospatial vector data for the geographical area corresponding to the geofence generation feature, in accordance with at least one embodiment. FIG. 3 illustrates seed points 300 and polygons 302 generated using the seed points 300 and geospatial vector data for a geographic area 304 corresponding to the geofence generation features described herein. FIG. 3 also illustrates generating geofences 306 for the geographical area 304 which have been modified using barrier geospatial vector data for the geographical area 304 such that the generated geofences 306 respect boundaries of barriers such as road networks 308 and bodies of water 310.

The geofences 306 generated using the geofence generation feature which are modified can reduce defects or errors during delivery of an item by a delivery entity to a delivery point or seed point 300 in the geographical area 304. For example, by being aware of barriers such as road network 308 or bodies of water 310, delivery entities who attempted to provide GPS scan data during a delivery from within a road network 308 and outside of a given geofence 306 would not be compliant. In such a scenario the delivery entity may be queried for input to move a pin or interactive object in a user interface of an associated user device to be within a geofence in order to be compliant. In some situations the delivery entity may be asked to enter a geofence 306 for a given delivery point and provide additional GPS scan data before being allowed to continue to other deliveries. Customers are more likely to indicate that deliveries are received when the deliveries are made within a geofence 306 for an intended delivery point.

Figure 4:
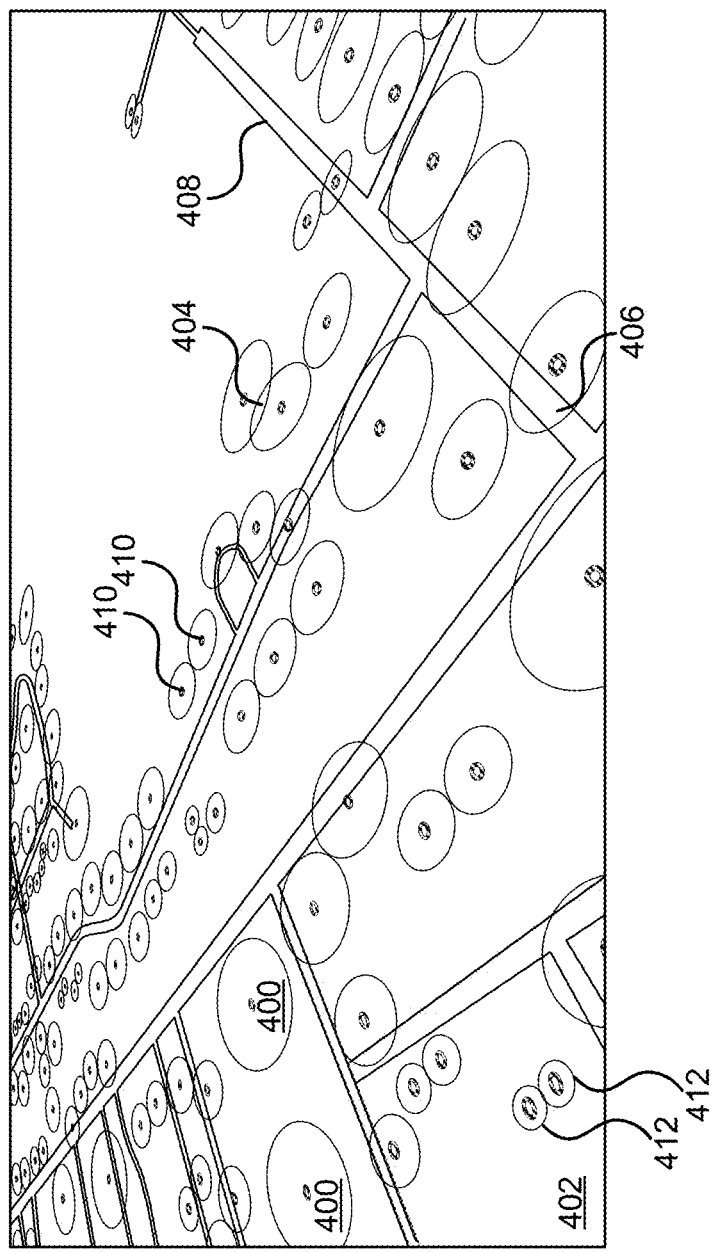
FIG. 4 illustrates an example of several geofences for a geographical area which have been modified using the geofence generation feature, in accordance with at least one embodiment.

FIG. 4 illustrates an example of several geofences for a geographical area which have been modified using the geofence generation feature, in accordance with at least one embodiment. FIG. 4 depicts several geofences 400 for a geographical area 402 generated using the geofence generation feature described herein. The geofences 400 may have been modified according to information for the geographical area 402 and/or according to applying one or more cost function policies. As is illustrated in FIG. 4, certain geofences 400 overlap 404 with another geofence 400, overlap 406 with a road network 408, and are of various sizes. Each geofence 404 includes a seed point 410 which may correspond to a delivery point for an address or geocode within the geographical area 402. As described herein, the non-overlapping geofences generated by the geofence generation feature may be modified to grow, shrink, or change shape to be neighborhood aware geofences which are of a certain size or shape to conform to barriers or constraints.

For example, the geofences 400 overlapping at 404 may be determined, by the service provider computer implementing the geofence generation feature, to be of an optimal size and shape given information about the surrounding area. For example, historical GPS scan data from an area that corresponds to the geofences 400 with the overlap 404 may indicate that the overlap 404 is acceptable when weighed against enforcing non-overlap between the geofences 400 and increasing delivery entity stress and/or did-not-receive responses from customers. As another example, a cost function policy implemented by the service provider computers may determine that the overlap 406 for a geofence 400 with a road network 408 is acceptable given other constraints such as structural data, neighborhood data, and GPS accuracy. A delivery point corresponding to the geofence with the overlap 406 may historically have terrible GPS reception and therefore warrant the extension of the geofence 400 into the road network 408 in order to enable delivery entities to provide accurate GPS scan data and not be too delayed when delivering to the associated delivery point. In embodiments, the service provider computers may maintain a value which represents a minimum size for a generated geofence 400 such as geofences 412 to ensure that geofences are not of a certain size that it would be all but impossible for a delivery entity to provide accurate GPS scan data to an associated delivery point.

In accordance with at least one embodiment, the geofences 400 may be further tuned (modified) using other neighborhood geometries (neighborhood data), barrier geospatial vector data for a geographical area, historic GPS scan data for the geographical area, GPS accuracy data, cost function policies, or other suitable information. For example, geofences 400 which are too small may be increased in size as a trade-off indicated by an overlap penalty. For example, the cost function policies may assign certain weights to metrics such as one cost for overlap with a road network, another cost for an overlap with a body of water, another cost assigned to overlap with another geofence, etc. A metric associated with clear or non-overlapping fraction between geofences, a number of overlapping geofences (e.g., how many other geofences does one geofence overlap with), an average of pair-wise overlap fraction of a certain geofence with each neighboring geofence, conditional metrics such as a neighboring geofence type for complexes or units, and maximum overlap with geofences for a given geofence may each be assigned a weight and conditions for enabling modifying of the geofences 400 in the geographical area 402.

Regions or areas within the geographical area 402 may also be assigned costs for each overlapping geofence, clear geofence, etc., to determine a neighborhood cost which can be refined by modifying the size and shape of corresponding geofences 400 according to the cost function policies. In embodiments, the service provider computers implementing the geofence generation feature may determine and apply an overall modification to each geofence 400 within a geographical area 402 according to the cost function policies. In embodiments, the service provider computers may be configured to generate a risk score for each delivery to a delivery point in geographical area 402 based on information about the delivery entity (e.g., an experienced delivery entity, knowledge of the delivery entity of the geographical area, etc.,), the geographical area 402, the delivery point, or other suitable information. The risk score may represent a probability of a did-not-receive response being provided by a customer associated with a delivery point after an intended delivery was not received by the customer.

The service provider computers may enforce different requirements for a delivery entity when delivering an item to a delivery point based on the risk score. For example, if a generated risk score indicates a high likelihood of a did-not-receive response, the system may enforce a requirement indicating that the delivery entity must communicate with a support line or technician to confirm delivery at the delivery point before moving onto another delivery. The location of the GPS scan provided by the delivery entity and the risk score for the delivery point may be utilized to modulate a requirement for the delivery entity. For example, GPS scan data provided by a delivery entity outside of a geofence for a delivery point would normally require a communication with a support line. However, if the risk score is low, the service provider computers may only require that the driver move a pin on a user interface to indicate where the delivery took place before they are allowed to continue to a next delivery.

Figure 5:
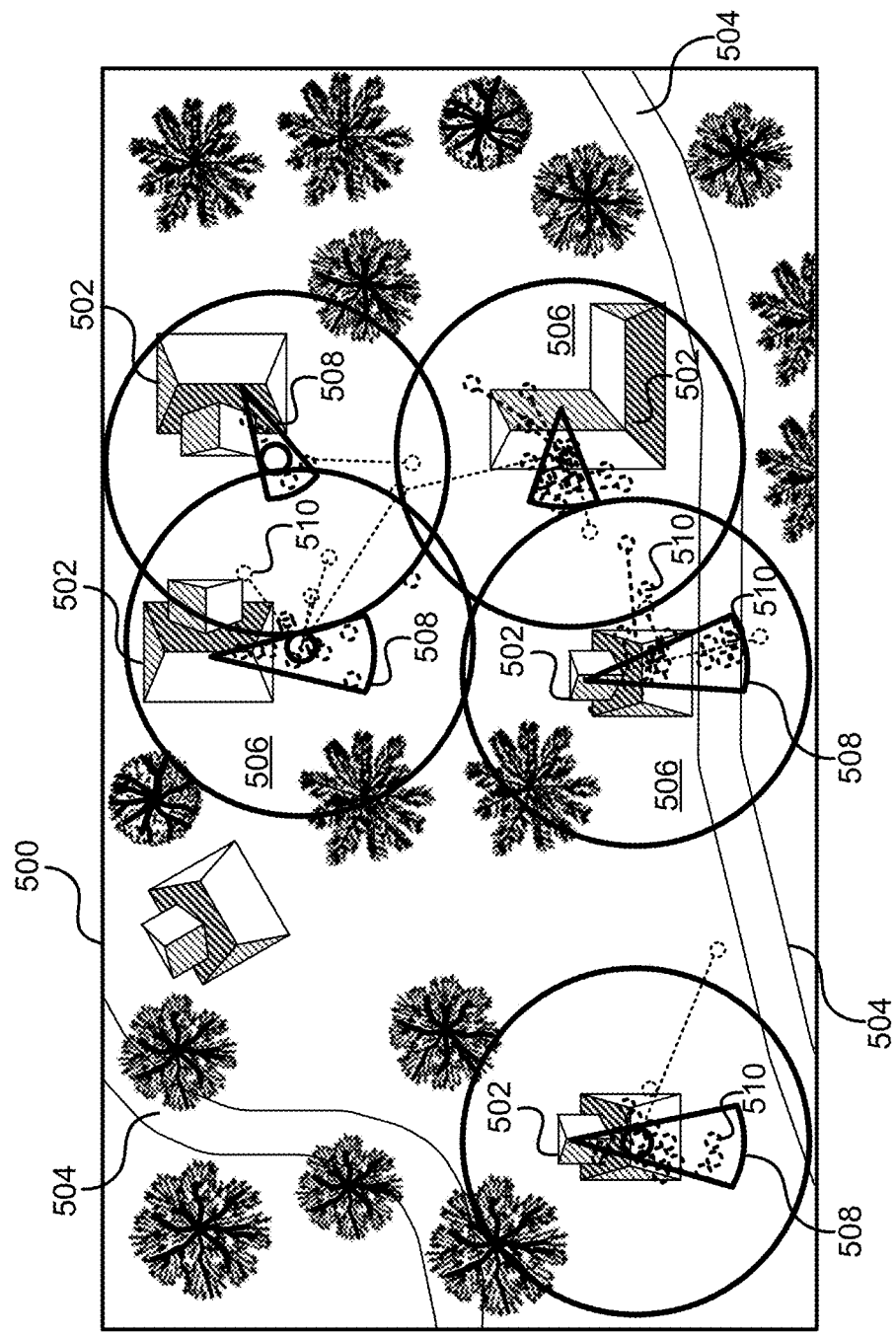
FIG. 5 illustrates an example of a user interface that presents a map of a geographical area for use by a delivery entity when delivering an item that is overlaid with an area that corresponds to a modified geofence to guide the delivery entity during the delivery, the area generated by the geofence generation feature, in accordance with at least one embodiment.

FIG. 5 illustrates an example of a user interface that presents a map of a geographical area for use by a delivery entity when delivering an item that is overlaid with an area that corresponds to a modified geofence to guide the delivery entity during the delivery, the area generated by the geofence generation feature, in accordance with at least one embodiment. FIG. 5 depicts a map of a geographical area 500 which includes several structures 502, barriers such as roads 504, one or more geofences 506, generated areas (safe zones) 508, as well as historic GPS scan data locations 510. In embodiments, the map of FIG. 5 may be presented via a user interface of a user device associated with a delivery entity. A delivery entity may refer to the user interface to obtain guidance as to where to deliver an item for a given delivery point associated with a particular structure 502. In embodiments, the delivery entity may interact with the user interface to provide confirmation of a location of a delivery of an item, provide additional GPS scan data for the user device during or after a delivery in response to a query, or communicate with a technician or support line in order to move onto a next delivery.

As illustrated in FIG. 5, the strictures 502 may be of various sizes and shapes, each with their own unique entry and exit points which may serve as intended delivery locations for a delivery point. Some of the geofences 506 presented in FIG. 5 overlap with other geofences 506 of the geographical area 500 based on modifications to the size and shape of the geofences 506 by the service provider computers using information and/or cost function policies. In embodiments, the geofences 506 may include visual indicators to aid a delivery entity in providing GPS scan data in an appropriate location corresponding to a delivery point (e.g., structure 502). In accordance with at least one embodiment, the service provider computers may generate an area 508 which serves as a visual cue or indicator to guide a delivery entity when delivering an item. Such areas 508 may be generated by the service provider computers utilizing geospatial vector data for the geographical area 500, historic GPS scan data locations 510, GPS accuracy data, structural data, neighborhood data, or other information. The user interface of the user device may be configured to provide additional indicators or cues to guide the delivery entity to deliver an item for an intended delivery point within an area such as area 508 for a corresponding structure 502. In embodiments, the areas 508 may overlap with other geofences 506 or barriers 504 based on applying the same cost function policies in order to increase compliance of the delivery entity with GPS policies balanced against reducing the number of did-not-receive responses provided by customers.

Figure 6:
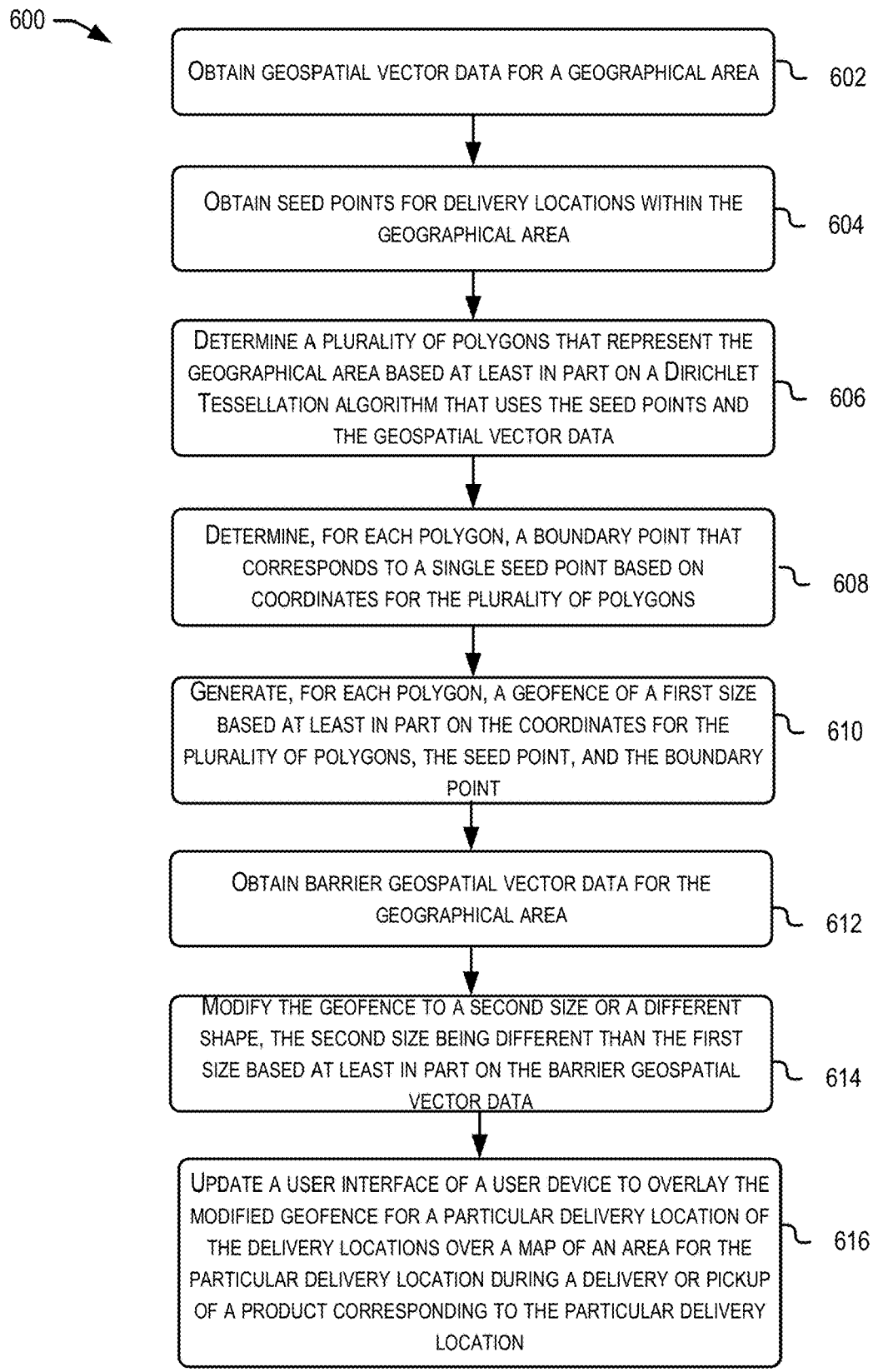
FIG. 6 illustrates an example flow diagram of a geofence generation feature, in accordance with at least one embodiment.
Figure 7:
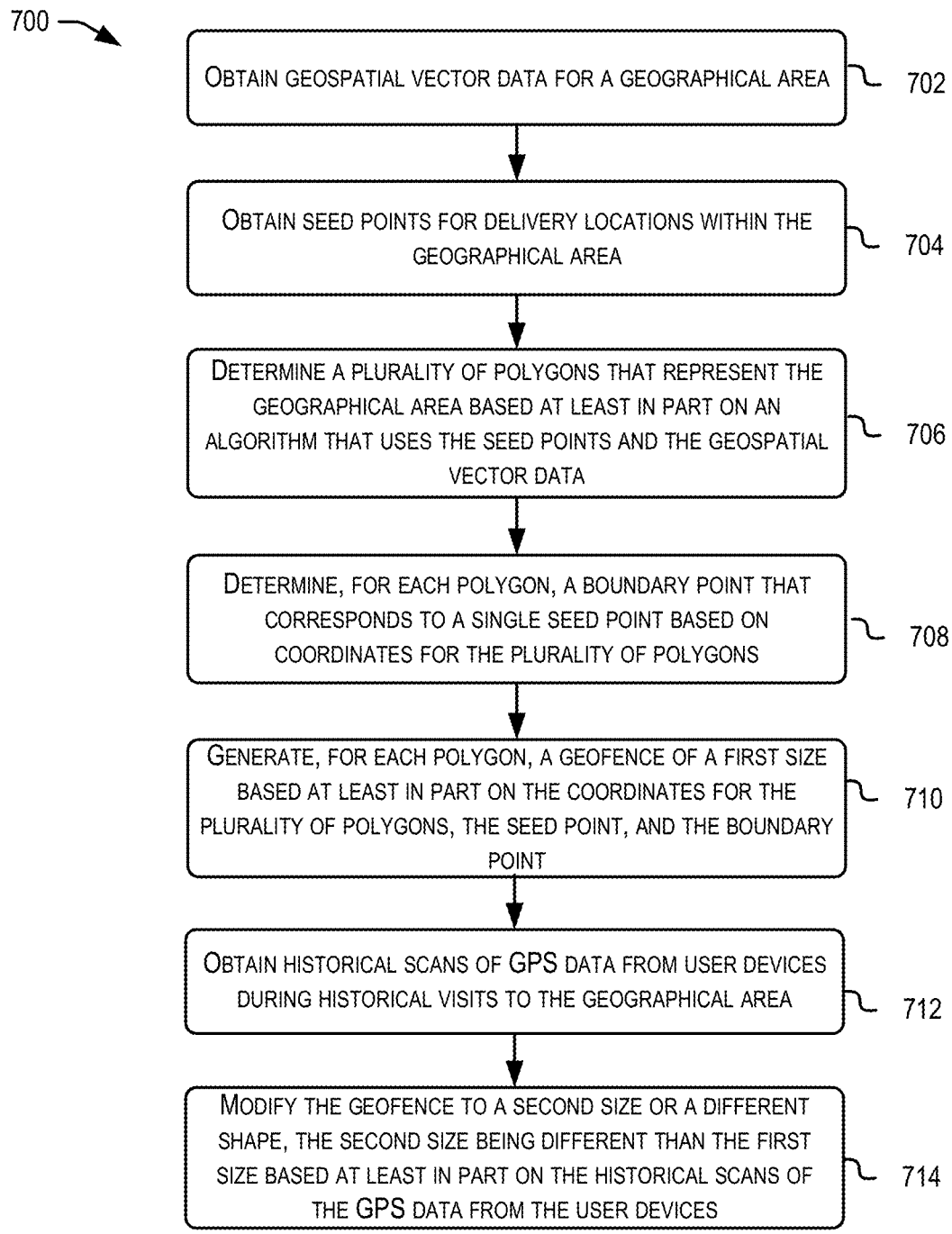
FIG. 7 illustrates an example flow diagram of a geofence generation feature, in accordance with at least one embodiment.

FIGS. 6 and 7 illustrate example flow charts for geofence generation features, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the processes (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 8:
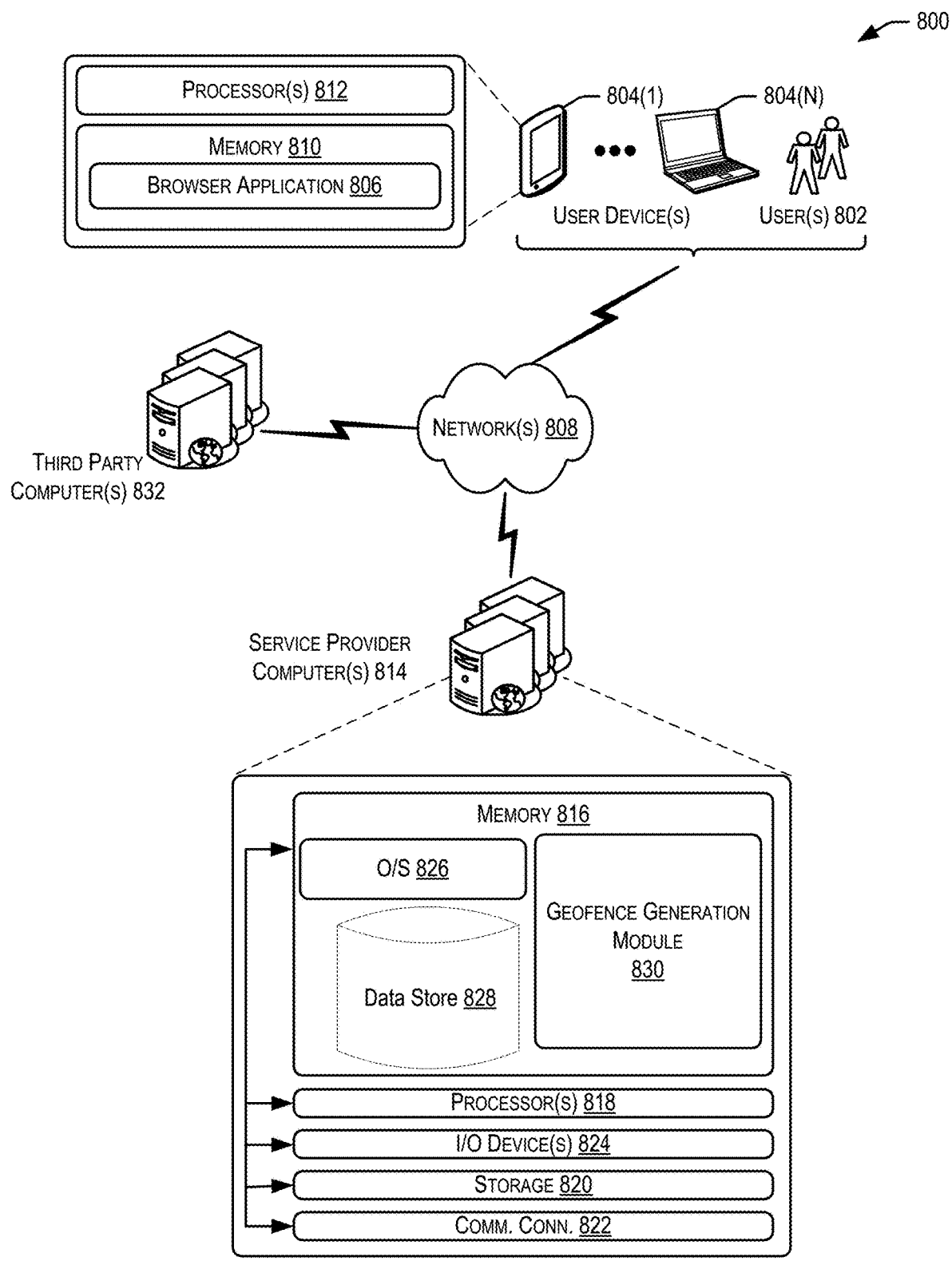
FIG. 8 illustrates an example architecture for implementing a geofence generation feature, in accordance with at least one embodiment.

In some examples, the service provider computers (service provider computers 814) utilizing at least the geofence generation module 830 depicted in FIG. 8 may perform the processes 600 and 700 of FIGS. 6 and 7. In FIG. 6, the process 600 may include obtaining geospatial vector data for a geographical area at 602. In embodiments, the geospatial vector data may be stored in a Shapefile. The service provider computers implementing the geofence generation feature may modify the Shapefile to generate polygons which will be used to represent a geographical area as well as generate geofences which may be used to update a user interface such as an overlay for a map of an area that corresponds to an address (delivery location) during delivery (or pickup) of an item (product) to the geographical area. The process 600 may include obtaining seed points for delivery locations within the geographical area at 604.

In embodiments, the seed points may represent a delivery point for an address where each seed point is unique to a specific address within a geographical area. The process 600 may include determining a plurality of polygons that represent the geographical area based at least in part on a Dirichlet tessellation algorithm that uses the seed points and the geospatial vector data for the geographical area at 606. In embodiments, a polygon of the polygons may include a Voronoi polygon for each distinct seed point of the seed points of the geographical area. In embodiments, the polygons may be barrier aware polygons. The geographical area may include a set of geographical coordinates that encompass an area such as postal codes, neighborhoods, census tracts, or ZIP code tabulation areas.

The process 600 may include determining, for each polygon, a boundary point that corresponds to a single seed point based on coordinates for the plurality of polygons at 608. In embodiments, the boundary point may represent a nearest boundary point of the nearest polygon to determine a radius of a circle which will serve as the radius for determining a geofence of a first size. The process 600 may include generating, for each polygon, a geofence of a first size based at least in part on the coordinates for the plurality of polygons, the seed point, and the boundary point at 610. In embodiments, the geofence for each polygon may be of a certain size such that no geofence for any given polygon within the geographical area overlaps with another geofence of another polygon within the geographical area. The geofence generation feature described herein generates the geofence of the first size to maximize the size of the geofence for each polygon while being aware of neighboring locations and geofences for said neighboring locations. The process 600 may include obtaining barrier geospatial vector data for the geographical area at 612. In embodiments, the barrier geospatial vector data may represent and include shapes, coordinates, and locations of barriers such as road networks, road entrances, parks, rivers, lakes, or other barriers which may be used to modify the shape and size of the geofence for each polygon.

The process 600 may include modifying the geofence to a second size or a different shape where the second size is different than the first size based at least in part on the barrier geospatial vector data at 614. In accordance with at least one embodiment, the geofence generation feature includes modifying not only the size but the shape of the geofence for each polygon using the barrier geospatial vector data or other information such as historical GPS scans from user devices during historical deliveries of items to each address (e.g., seed point and polygon), or GPS accuracy data indicating the accuracy of GPS signals provided by user devices within or near each polygon and seed point. In embodiments, modifying a previously generated geofence may include reducing the size of the geofence as well as increasing the size of the geofence. In accordance with at least one embodiment, modifying the geofence may include utilizing one or more cost function policies which weigh cost parameters differently to determine whether it is more optimal to increase a given geofence to such a size that it overlaps another geofence.

The process 600 may include updating a user interface of a user device to overlay the modified geofence for a particular delivery location of the delivery locations over a map of an area for the particular delivery location during a delivery or pickup of a product corresponding to the particular delivery location at 616. In accordance with at least one embodiment, the service provider computers implementing the geofence generation feature may generate data objects or user interface objects for updating a user interface presented via a user device. The data objects or user interface objects may be configured to modify and/or update the user interface presented via a user interface and provide information about a generated geofence for an address during a delivery of an item to said address by a delivery entity. For example, a delivery entity may be required to provide a GPS scan during a delivery of an item to an address and in order to conform with delivery policies be within a certain distance of a delivery point that corresponds to the address (e.g., within a geofence). The user interface of the delivery entity's user device may be updated to overlay or otherwise incorporate a user interface object that represents the geofence and/or a safe zone for delivering the item and conforming with the geofence policy when providing a GPS scan after or during delivery of an item to the address. In embodiments, the size and shape of the geofence and or safe zone (area) may be modified based on obtaining neighborhood data which identifies locations, coordinates, and sizes of structures within the geographical area. In embodiments, the service provider computers may be configured to determine the seed points using geocodes from a third party computer(s). The geocodes may be ranked according to a ranking algorithm and the service provider computer may select the highest ranking geocode for each address as the seed point for the address in the geographical area.

In FIG. 7, the process 700 may include obtaining geospatial vector data for a geographical area at 702. The process 700 may include obtaining seed points for delivery locations within the geographical area at 704. Each seed point may correspond to an address of the addresses (e.g., each seed point may be distinct). The process 700 may include determining a plurality of polygons that represent the geographical area based at least in part on an algorithm that uses the seed points and the geospatial vector data at 706. In embodiments, the polygons may correspond to Voronoi polygons and each polygon may correspond to a single seed point. The process 700 may include determining, for each polygon, a boundary point that corresponds to a single seed point based on coordinates for the plurality of polygons at 708. The process 700 may include generating, for each polygon, a geofence of a first size based at least in part on the coordinates for the plurality of polygons, the seed point, and the boundary point at 710.

The process 700 may include obtaining historical scans of GPS data from user devices during historical visits to the geographical area at 712. In embodiments, the historical scans of GPS data may correspond to GPS data from user devices of delivery entities during historical deliveries to an address of the geographical area or during historical pickups of products to the address. The historical scans of GPS data may be associated with the position of a delivery entity's user device when they indicated that they had delivered an item to a particular address within the geographical area. The service provider computers may be able to determine the distance between a given historical scan of GPS data and the delivery point (e.g., seed point) for each address within the geographical area. The process 700 may include modifying the geofence to a second size or a different shape where the second size is different than the first size based at least in part on the historical scans of the GPS data from the user devices at 714. In embodiments, the service provider computers may be configured to modify the shape and size of the geofence for each polygon or particular address within the geographical area using the historical scans of the GPS data or other information such as GPS accuracy information. In embodiments, the service provider computers implementing the geofence generation feature may be configured to generate and maintain a value that corresponds to a minimum size for a generated geofence for any given address within the geographical area. For example, the value may correspond to 20 meters.

FIG. 8 illustrates an example architecture for implementing a geofence generation feature, in accordance with at least one embodiment. In architecture 800, one or more users 802 (e.g., delivery associates, users, delivery entities, etc.,) may utilize user computing devices 804(1)-(N) (collectively, user devices 804) to access a browser application 806 or a user interface (UI) accessible through the browser application 806, via one or more networks 808 to receive a representation of a geofence or safe zone (area) to deliver an item to a delivery point within a geographical area. In embodiments, the representation of the geofence or safe zone may include coordinates, visual indicators, or other graphical markers to guide the user 802 to an area which corresponds to a delivery point associated with delivery of the item for a particular address within the geographical area. The "browser application" 806 can be any browser control or native application that can access and display a network page or other information such as a user interface of a native software application for enabling the presentation of a representation of a geofence and/or area within a geographical area. A native software application may include an application or program that has been developed for use on a particular platform (such as an operating system) or a particular device (such as a particular type of mobile device or user device 804). In embodiments, the user device 804 may include one or more components for enabling the user 802 to interact with the browser application 806. For example, the user device 804 may include input/output devices (not pictured) which enable a user 802 to interact with a user interface (e.g., browser application 806) presented via the user device 804 to provide confirmation of a current location of the user device 804 (e.g., provide a GPS scan indicating conformity of being located within a generated geofence for a delivery point).

The user devices 804 may include at least one memory 810 and one or more processing units or processor(s) 812. The memory 810 may store program instructions that are loadable and executable on the processor(s) 812, as well as data generated during the execution of these programs. Depending on the configuration and type of the user devices 804, the memory 810 may be volatile (such as random access memory (RAM)) and/or non-volatile (such as read-only memory (ROM), flash memory, etc.). The user devices 804 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 804. In some implementations, the memory 810 may include multiple different types of memory, such as static random access memory (SRAM), dynamic random access memory (DRAM), or ROM. The user devices 804 may also include GPS receivers and other components (hardware and/or software) for determining a location of the user devices 804 during a delivery of an item.

Turning to the contents of the memory 810 in more detail, the memory 810 may include an operating system and one or more application programs or services for implementing the features disclosed herein. Additionally, the memory 810 may include one or more modules for implementing the features described herein including a geofence generation module 830.

The architecture 800 may also include one or more service provider computers 814 that may, in some examples, provide computing resources such as, but not limited to, client entities, low latency data storage, durable data store, data access, management, virtualization, hosted computing environment or "cloud-based" solutions, geofence generation feature implementation, etc. The service provider computers 814 may implement or be an example of the service provider computer(s) described herein with reference to FIGS. 1-7 and throughout the disclosure. The one or more service provider computers 814 may also be operable to provide site hosting, computer application development, and/or implementation platforms, combinations of the foregoing, or the like to the one or more users 802 via user devices 804.

In some examples, the networks 808 may include any one or a combination of many different types of networks, such as cable networks, the Internet, wireless networks, cellular networks, and other private and/or public networks. While the illustrated examples represents the users 802 communicating with the service provider computers 814 over the networks 808, the described techniques may equally apply in instances where the users 802 interact with the one or more service provider computers 814 via the one or more user devices 804 over a landline phone, via a kiosk, or in any other manner. It is also noted that the described techniques may apply in other client/server arrangements (e.g., set-top boxes, etc.), as well as in non-client/server arrangements (e.g.., locally stored applications, peer-to-peer arrangements, etc.).

The one or more service provider computers 814 may be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 814 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 814 may be in communication with the user device 804 via the networks 808, or via other network connections. The one or more service provider computers 814 may include one or more servers, perhaps arranged in a cluster or as individual servers not associated with one another. In embodiments, the service provider computers 814 may be in communication with one or more third party computers 832 via networks 808 to receive or otherwise obtain data including seed points for a geographical area, geospatial vector data, barrier geospatial vector data, previously generated geofences for a geographical area, historical GPS scan data, or other suitable information for generating geofences and modifying geofences as described herein.

In one illustrative configuration, the one or more service provider computers 814 may include at least one memory 816 and one or more processing units or processor(s) 818. The processor(s) 818 may be implemented as appropriate in hardware, computer-executable instructions, firmware, or combination thereof. Computer-executable instruction or firmware implementations of the processor(s) 818 may include computer-executable or machine-executable instructions written in any suitable programming language to perform the various functions described when executed by a hardware computing device, such as a processor. The memory 816 may store program instructions that are loadable and executable on the processor(s) 818, as well as data generated during the execution of these programs. Depending on the configuration and type of the one or more service provider computers 814, the memory 816 may be volatile (such as RAM) and/or non-volatile (such as ROM, flash memory, etc.). The one or more service provider computers 814 or servers may also include additional storage 820, which may include removable storage and/or non-removable storage. The additional storage 820 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 816 may include multiple different types of memory, such as SRAM, DRAM, or ROM.

The memory 816, the additional storage 820, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 816 and the additional storage 820 are all examples of non-transitory computer storage media. Additional types of non-transitory computer storage media that may be present in the one or more service provider computers 814 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 814. Combinations of any of the above should also be included within the scope of non-transitory computer-readable media.

The one or more service provider computers 814 may also contain communication connection interface(s) 822 that allow the one or more service provider computers 814 to communicate with a data store, another computing device or server, user terminals, and/or other devices on the networks 808. The one or more service provider computers 814 may also include I/O device(s) 824, such as a keyboard, a mouse, a pen, a voice input device, a touch input device, a display, speakers, a printer, etc.

Turning to the contents of the memory 816 in more detail, the memory 816 may include an operating system 826, one or more data stores 828, and/or one or more application programs or services for implementing the features disclosed herein including the geofence generation module 830. In accordance with at least one embodiment, the geofence generation module 830 may be configured to receive or obtain geospatial vector data and seed points for a geographic area. In embodiments, the geospatial vector data and seed points may be stored and transmitted as Shapefiles and coordinates, respectively. In accordance with at least one embodiment, barrier geospatial vector data may be extracted from a Shapefile for a geographical area. In embodiments, the geofence generation module 830 may be configured to implement an algorithm, such as a Dirichlet Tessellation algorithm, to determine a plurality of polygons that represent the geographical area using the seed points and the geospatial vector data. In embodiments, a polygon of the polygons may be a Voronoi polygon and each polygon may be distinct for each seed point of the geographical area. In accordance with at least one embodiment, the geofence generation module 830 may be configured to determine a boundary point for each seed point using coordinates for the plurality of polygons that represents the nearest boundary point of the nearest polygon to determine a radius of a circle which will serve as the radius for determining a geofence of a first size.

The geofence generation module 830 may generate, for each polygon, a geofence of a first size using the seed point, the boundary point, and coordinates for the plurality of polygons. The geofence of the first size for each polygon may be of a size that results in no geofence overlapping within the geographical area. In embodiments, the geofence generation module 830 may be configured to utilize barrier geospatial vector data, historical scans of GPS data from user devices during historical deliveries to the geographical area, GPS accuracy data from user devices during deliveries to the geographical area, and/or one or more cost function policies, to modify the size of the geofence to a second size that is different than the first size. In embodiments, the geofence of the second size or any other modified size using the geofence generation features described herein may overlap with one or more other geofences for one or more other delivery points (seed points) for the geographical area. The geofence generation module 830 may be configured to generate and transmit a user interface or data objects for updating a user interface presented via browser application 806 and user device 804 for presenting a generated geofence as well as a safe zone or area for delivering an item to a particular address within the geographical area. In embodiments, the geofence generation module 830 may be configured to request confirmation from the user 802 via browser application 806 and user device 804 for a GPS location signal or GPS scan data during a delivery to determine conformity with the generated geofence (e.g., that the delivery entity delivered an item to the correct address and checked in with the service provider computers 814 with a GPS signal that indicates that they were within the geofence during delivery of said item to a particular address). Other graphical updates, feedback mechanisms, and data object generation associated with the geofence generation features described herein may be implemented by the service provider computers 814 and the geofence generation module 830.

Figure 9:
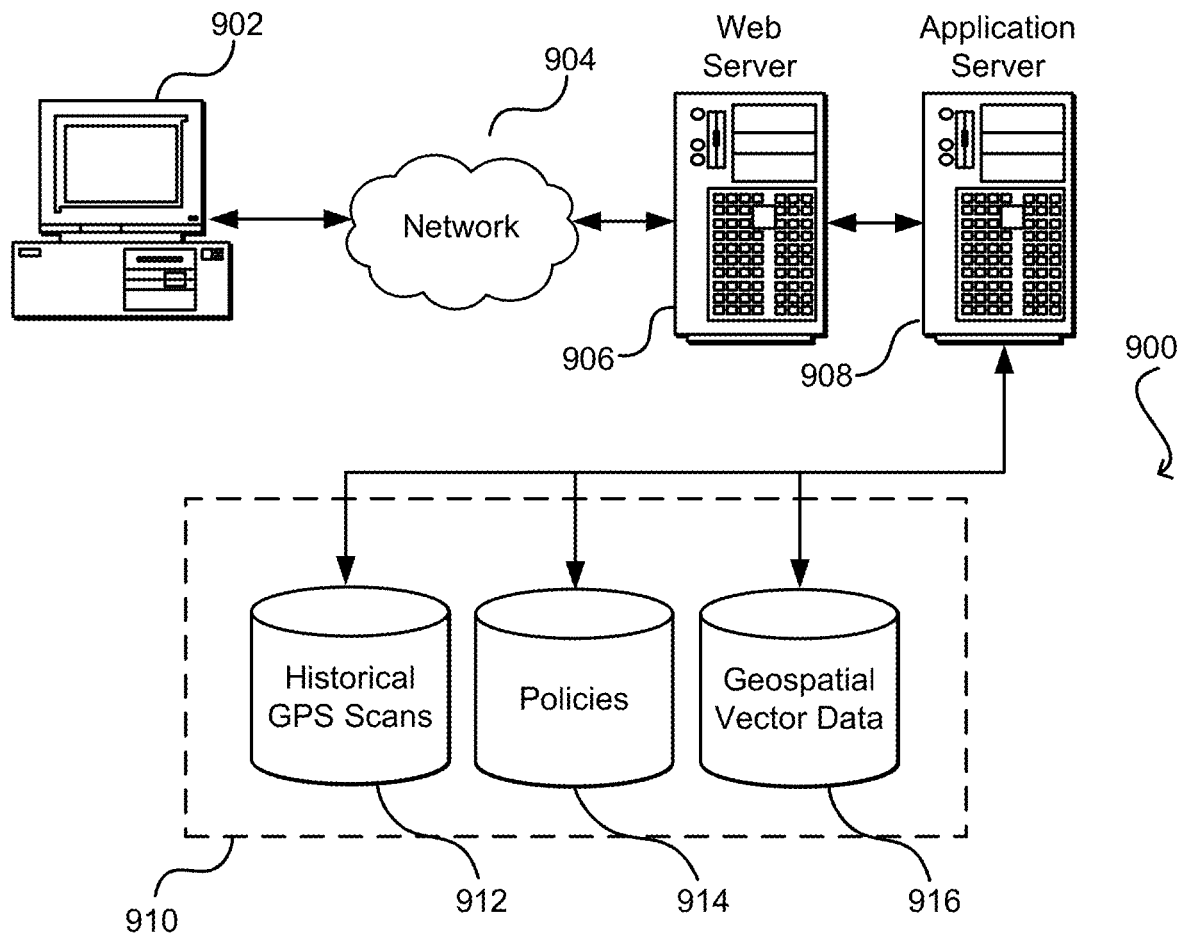
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing historical GPS scans 912 and geospatial vector data 916, which can be used to serve content for the production side as well as generate neighborhood aware geofences to aid delivery entities deliver items to delivery locations or delivery points. The data store also is shown to include a mechanism for storing policies 914, which can be used for reporting, analysis, or other such purposes such as modifying (e.g., growing or shrinking or otherwise changing the shape of) generated geofences. In embodiments, the policies 914 may include cost function parameters or metrics which are weighted and applied to determine whether to modify the size and/or shape of a generated geofence using the geofence generation feature described herein. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser. In another example, a delivery entity may enter a delivery address for delivering an item to a delivery point in order to obtain guidance for a safe zone or geofence which would be in compliance with policies which verify delivery of the item to the correct address. The generated geofence may be returned to the user device 902 of the delivery entity such that it is presented via a user interface of the user device 902 as an overlay or as indicators to guide the delivery entity during delivery of the item to a delivery point.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    obtaining, by a computer system, geospatial vector data for a geographical area;
    obtaining, by the computer system, seed points for delivery locations within the geographical area, each seed point of the seed points corresponding to one or more delivery locations of the delivery locations;
    determining, by the computer system, a plurality of polygons that represent the geographical area based at least in part on a Dirichlet Tessellation algorithm that uses the seed points and the geospatial vector data, a polygon of the plurality of polygons including a Voronoi polygon and a single seed point of the seed points;
    determining, by the computer system and for each polygon of the plurality of polygons, a boundary point that corresponds to the single seed point based at least in part on coordinates for the plurality of polygons;
    generating, by the computer system and for each polygon, a geofence of a first size based at least in part on the coordinates for the plurality of polygons, the seed point, and the boundary point;
    obtaining, by the computer system, barrier geospatial vector data for the geographical area;
    modifying, by the computer system, the geofence to a second size or a different shape, the second size being different than the first size based at least in part on the barrier geospatial vector data; and
    updating, by the computer system, a user interface of a user device to overlay the modified geofence for a particular delivery location of the delivery locations over a map of an area for the particular delivery location during a delivery of a product or pickup of a product to the particular delivery location, the map of the area corresponding to a portion of the geographical area.

2. The computer-implemented method of claim 1, further comprising obtaining, by the computer system, neighborhood data for the geographical area that comprises locations of structures within the geographical area and coordinates that indicate sizes of the structures.

3. The computer-implemented method of claim 1, further comprising modifying, by the computer system, the geofence to a third size or the different shape that is different than the first size and the second size based at least in part on the neighborhood data.

4. The computer-implemented method of claim 1, wherein the geographical area is represented by postal codes, neighborhoods, census tracts, ZIP code tabulation areas, or a bounding box comprised of longitude and latitude coordinates.

5. The computer-implemented method of claim 1, further comprising:
    obtaining, by the computer system, geocodes for the delivery locations within the geographical area;
    ranking, by the computer system, the geocodes for each of the delivery locations using a ranking algorithm; and
    determining, by the computer system, the seed points for the delivery locations within the geographical area based at least in part on the ranked geocodes.

6. The computer-implemented method of claim 1, wherein the barrier geospatial vector data identifies barriers represented as shapes for roads, highways, rivers, lakes, mountains, or parks for the geographical area.

7. A non-transitory computer-readable storage medium storing computer-executable instructions that, when executed by a computer system, configure the computer system to perform operations, comprising:
    obtaining geospatial vector data for a geographical area;
    obtaining seed points for delivery locations within the geographical area, each seed point of the seed points corresponding to a delivery location of the delivery locations;
    determining a plurality of polygons that represent the geographical area based at least in part on an algorithm that uses the seed points and the geospatial vector data, a polygon of the plurality of polygons including a Voronoi polygon and a single seed point of the seed points;
    determining, for each polygon of the plurality of polygons, a boundary point that corresponds to the single seed point based at least in part on coordinates for the plurality of polygons;
    generating, for each polygon, a geofence of a first size based at least in part on the coordinates for the plurality of polygons, the seed point, and the boundary point;
    obtaining historical scans of GPS data from user devices during historical visits to the geographical area; and
    modifying the geofence to a second size or a different shape, the second size being different than the first size based at least in part on the historical scans of the GPS data from the user devices.

8. The non-transitory computer-readable storage medium of claim 7, wherein the instructions, when executed by the computer system, further configure the computer system to perform operations comprising updating a user interface of a user device to overlay the modified geofence for a particular delivery location of the delivery locations over a map of an area for the particular delivery location during a delivery or pickup of a product to the particular delivery location, the map of the area corresponding to a portion of the geographical area.

9. The non-transitory computer-readable storage medium of claim 8, wherein the instructions, when executed by the computer system, further configure the computer system to perform operations comprising generating a query for input from a user associated with the user device during the delivery or the pickup of the product associated with the particular delivery location, the input corresponding to a GPS signal for the user device while within the modified geofence for the particular delivery location.

10. The non-transitory computer-readable storage medium of claim 7, wherein the instructions, when executed by the computer system, further configure the computer system to perform operations comprising generating, for each delivery location of the delivery locations, an area that corresponds to an updated geofence based at least in part on structural data for a structure of the delivery location.

11. The non-transitory computer-readable storage medium of claim 10, wherein the instructions, when executed by the computer system, further configure the computer system to perform operations comprising:
updating a user interface of a user device to overlay the area for a particular delivery location of the delivery locations over a map for the particular delivery location during a delivery or pickup of a product corresponding to the particular delivery location, the map for the particular delivery location corresponding to a portion of the geographical area, the overlay of the area for the particular delivery location including one or more visual indicators.

12. The non-transitory computer-readable storage medium of claim 11, wherein the visual indicators include highlighting boundaries for the area for the particular delivery location.

13. The non-transitory computer-readable storage medium of claim 7, wherein the instructions, when executed by the computer system, further configure the computer system to perform operations comprising maintaining a value that corresponds to a minimum size for the geofence for each delivery location of the delivery locations.

14. A computer system comprising:
a memory configured to store computer-executable instructions; and
a processor in communication with the memory configured to execute the computer-executable instructions to at least:
obtain geospatial vector data for a geographical area;
obtain seed points for delivery locations within the geographical area, each seed point of the seed points corresponding to a delivery location of the delivery locations;
determine a plurality of polygons that represent the geographical area based at least in part on an algorithm that uses the seed points and the geospatial vector data, a polygon of the plurality of polygons including a Voronoi polygon and a single seed point of the seed points;
determine, for each polygon of the plurality of polygons, a boundary point that corresponds to the single seed point based at least in part on coordinates for the plurality of polygons;
generate, for each polygon, a geofence of a first size based at least in part on the coordinates for the plurality of polygons, the seed point, and the boundary point;
obtain GPS accuracy data from user devices for the geographical area; and
modify the geofence to a second size or a different shape, the second size being different than the first size based at least in part on the GPS accuracy data from the user devices.

15. The computer system of claim 14, wherein the processor in communication with the memory is further configured to execute the computer-executable instructions to at least update a user interface of a user device to overlay the modified geofence for a particular delivery location of the delivery locations over a map of an area for the particular delivery location during a delivery or pickup of a product corresponding to the particular delivery location, the map of the area corresponding to a portion of the geographical area.

16. The computer system of claim 14, wherein the processor in communication with the memory is further configured to execute the computer-executable instructions to at least generate one or more cost function policies for modifying the second size or the different shape of the geofence using a plurality of cost parameters.

17. The computer system of claim 16, wherein the plurality of cost parameters include first data identifying failed deliveries corresponding to GPS signals within the geofence, second data identifying failed deliveries corresponding to the GPS signals outside the geofence, third data identifying the GPS signals from neighboring delivery locations, and fourth data identifying the GPS signals from road networks.

18. The computer system of claim 16, wherein the processor in communication with the memory is further configured to execute the computer-executable instructions to at least modify the geofence to a third size that is different than the first size and the second size based at least in part on the one or more cost function policies.

19. The computer system of claim 14, wherein the processor in communication with the memory is further configured to execute the computer-executable instructions to at least implement a model for generating a risk score that represents a probability of a failed delivery for each delivery location of the delivery locations using first data that identifies previous failed deliveries for each delivery location and second data that identifies experience of a delivery entity.

20. The computer system of claim 19, wherein the processor in communication with the memory is further configured to execute the computer-executable instructions to at least enforce one or more policies which require different levels of input from the delivery entity based at least in part on the risk score.

* * * * *